UNITED STATES PATENT OFFICE.

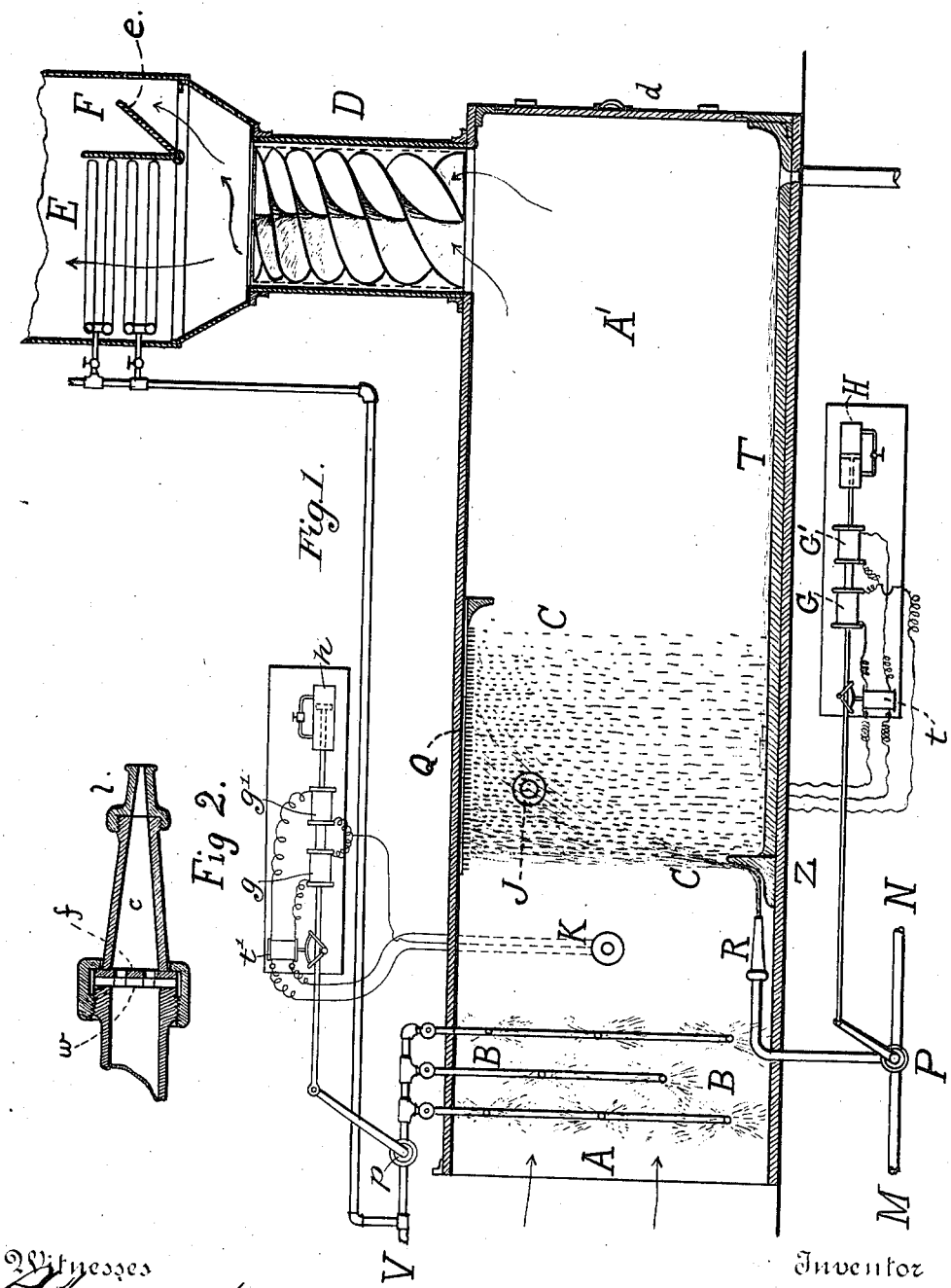

HARRY D. TIEMANN, OF WASHINGTON, DISTRICT OF COLUMBIA.

APPARATUS AND PROCESS FOR CONTROLLING HUMIDITY OF GASES IN DRYING OPERATIONS.

963,832.  Specification of Letters Patent.  Patented July 12, 1910.

Application filed March 29, 1910. Serial No. 552,284.

(DEDICATED TO THE PUBLIC.)

*To all whom it may concern:*

Be it known that I, HARRY D. TIEMANN, a citizen of the United States and an employee of the Forest Service, United States Department of Agriculture, a legal resident of the District of Columbia, residing at the city of Washington therein, (whose post-office address is 1714 Q street northwest,) have invented a new and useful Apparatus and Process for Controlling Humidity of Gases in Drying Operations and have made application by petition of even date herewith, under the act of March 3, 1883, chapter 143, (22 Stat., 625,) praying that Letters Patent therefor may be granted to me.

The invention herein described and claimed, may be used by the Government of the United States or by any of its officers and employees in the transaction of work for the Government, or by any person in the United States, without payment of any royalty thereon.

The following is the specification of my invention:

The object of my invention is to impart to air or other gas, used for drying or humidifying operations, a constant absolute humidity of any desired amount, and a means for regulating or controlling the same. To accomplish this result an excess of humidity is at first given to the current of gas, providing its humidity is deficient, by injecting steam under pressure, subject to regulation directly into the gas and subsequently condensing the excess of humidity therefrom, so as to reduce the vapor pressure to the exact amount required, by contact with a cooling spray of water the temperature of which may be regulated according to the vapor pressure, that is the absolute humidity, desired. Subsequently any suspended particles of moisture received from the spray are separated from the gas, and it may then be heated to whatever final temperature was desired.

I am aware that numerous apparatus comprising various combinations of steam sprays, water sprays, eliminators, and heaters have been invented and Letters Patent granted therefor. My method and apparatus is believed to differ essentially from any of them, in that I obtain the exact vapor pressure desired by a reduction of the temperature and pressure of vapor from a previously higher pressure and temperature to the exact amount required, by contact with water at a temperature less than that of the gas immediately before contact therewith, and at the same time I control the resulting vapor pressure or absolute humidity by regulating the temperature of the cooling water. The accompanying illustration shows an arrangement of apparatus designed to accomplished this result in the manner specified, but I do not restrict myself to the specific form of apparatus there shown, reserving the right to modify the same in any way consistent with the spirit of this invention, so long as it accomplish the desired results in a manner conforming to my claims.

In the illustration Figure 1 represents a sectional elevation of the apparatus in the form of a horizontal rectangular flue or passage A A$^1$ of suitable dimensions for supplying the requisite amount of air or gas, which is caused to pass therethrough in the direction indicated by arrows at a very slow velocity, so as to give ample time for the action of the condensing water and for separation of suspended particles of water by gravitation in the chamber A$^1$.

B B represents a series of steam jets, supplied with pressure steam from the pipe V, the flow being regulated by any suitable thermostat K. The device here shown consists of two solenoid coils $g$ $g^1$, acting in reverse order on an iron core or armature attached by a rod to the steam valve $p$, a dash-pot $h$, and a clutch which holds the rod stationary, except when a current is set up in either coil of the thermostat K. The action is similar in principle to that of the thermostat J and coils G G$^1$, described further on. These jets are intended to impart to the entering gas, if deficient, a vapor pressure slightly in excess of the final amount required, and consequently will also raise the temperature of the gas if its initial temperature be less than that corresponding to the necessary vapor tension.

C C is a fountain of water projected upward by the nozzle R and the spreader Z, which returns in the form of rain into the trough T. The nozzle R may be any suitable form of hose nozzle, the preferred form being the well-known one shown in Fig. 2, in which $w$ is a perforated washer, having two or more holes near its circumference, which normally register with similar holes in the flange $f$ of the cone $c$. The cone $c$ is rotatable, so that by turning it the registration of the holes is more or less interfered with. With the holes normal a smooth stream of water is delivered by the nozzle, but by turning the cone slightly it is broken up into spray.

1 is a detachable lip for reducing the size of the delivery orifice.

The stream of water is delivered horizontally against a curved baffle plate Z, more or less semicircular in shape and centrally located between the side walls. This plate is so shaped that it deflects the stream upward and outward in a fanlike manner, but so that the majority of the drops strike upon the upper horizontal wall or ceiling of the passage. At this point is placed a brush of metal points, Q, which might be composed of a great number of ordinary brass pins driven through a brass plate, arranged in brush fashion. The stream coming in contact with this brush is broken up into a great number of small drops, which fall from the points of the pins in the form of gentle rain, into the trough T. As the motion of the gas is very slow, ample time is given for complete condensation of the excess vapor by contact with this spray.

$A^1$ is a chamber or portion of the flue A $A^1$ of relatively large area.

D is a centrifugal separator consisting of a circular flue considerably smaller in cross-sectional area than that of the flue A $A^1$, in which are arranged helical or auger-like blades which impart to the air a rapid rotation as it ascends through the tube. This is intended to completely separate any remaining particles of moisture through centrifugal force. The water being much heavier than the air is thereby thrown outward against the walls, where it trickles down by gravitation into the trough T below. If a forced circulation of gas be used, a centrifugal fan may be placed at D, instead of the stationary blades, or the two may be combined. In some cases this centrifugal separator will be unnecessary and may be totally dispensed with.

E is a heater of any desired kind, having a regulatable by-pass F as commonly used, the damper $e$ being controlled by a thermostat.

$d$ is a door by which entrance may be had to the interior of the apparatus.

P is a mixing valve for supplying the nozzle R with water at the desired temperature, the water being supplied to P from a cooler N and a heater M, so that any temperature may be quickly given to the spray C C by manipulation of the valve P. This valve may be automatically operated by any suitable thermostat J placed in the spray C C. In the instance here illustrated the valve P is operated by a lever attached to a rod which is moved in either direction by two solenoid coils G $G^1$ acting in reverse order upon an iron core or armature. The motion is dampened by an adjustable dashpot H, so as to produce a ~~very~~ gradual movement of the valve. When there is no electric current in either coil the armature remains stationary for any position of the valve, but as soon as the thermostat J sets up a current in either coil, the lever is moved slowly in that direction, thus changing the valve P, until the proper temperature is restored to the water-spray, and the current being again cut off by action of the thermostat, the lever remains stationary in its new position. To prevent any motion of the valve when the current is cut off, there is a clutch $t$ on the rod which holds it fast, except when a current is passed through either solenoid, which acts on a magnetic coil, releasing the clutch. Thus the action is positive and static.

Having described the apparatus, I will now explain its operation upon the gas.

The air or gas first enters the flue A at whatever temperature or humidity it may happen to be. It is first saturated by the live steam at B B, and raised to a temperature slightly above that corresponding to the required vapor tension. Or if its vapor tension be already sufficient, no treatment is necessary by the steam jets. It next comes into intimate contact with the cooler water-spray, which cools the vapor and thus reduces it by condensation to the required pressure or absolute humidity, dependent upon the temperature of the water. It then passes slowly through the large chamber $A^1$ where all the larger drops of water held in suspension from the spray are precipitated by gravitation, due to the slow motion of the gas. The gas which now has the required amount of vapor then rises through the centrifugal separator D, either by natural draft due to the warmer air above or by means of a fan placed at D. The rapid rotational velocity, which the air receives in passing through D is intended to eliminate all remaining suspended particles of water through centrifugal force. In some cases, this separator D will probably be found superfluous, and it may then be entirely dispensed with. The gas then passes on up through the heater E, and thence to the chamber where used. If saturated gas is required, the heater E is thrown out of action, and the gas is delivered at the same temperature with which it leaves the water-spray. The parts are so proportioned that the gas has a relatively rapid velocity through D, and a slow motion through A A¹.

If the problem in hand calls for a temperature of the water-spray condenser below the freezing point, brine may be used in the water.

A concrete example will illustrate the working of the apparatus. Let us suppose that air is wanted for drying purposes at 100 degrees Fahrenheit, with 30 per cent. of relative humidity. The dew point will then be at 63 degrees and a vapor pressure corresponding to 63 degrees is called for. Suppose the available supply of air to be at 40 degrees. The thermostat at K is adjusted so that sufficient steam is imparted by the steam jet to raise the air and saturate it to about 68 degrees, or slightly above the temperature corresponding to the vapor pressure required. The temperature of the condensing water is then regulated so as to reduce the temperature of the air to 63 degrees, as it passes through into the chamber A¹. When the suspended drops of moisture are removed, and the saturated air then heated to 100 degrees, the required conditions are fulfilled. It matters not how much above the temperature of the condensing water the incoming air be heated, provided only that it contain a vapor pressure in excess of that required, so that it may be reduced to the exact amount by contact with the water. For economical working, however, it is best to have the incoming air saturated at a temperature only slightly in excess of that of the water.

I claim:—

1. A method of imparting to air or other gas, for use in drying or humidifying operations, any desired vapor pressure, and the means of regulating the same, consisting in first spraying steam into the gas sufficient to raise the vapor pressure to an amount in excess of that required, and subsequently reducing it to the proper amount by intimate contact with a sheet or spray of cooling water whose temperature is less than that of the gas immediately before contact therewith, and regulating the temperature of the water in order to control the resulting vapor pressure, and separating the suspended particles of water received from the spray by gravitation and centrifugal force in the manner and sequence substantially as described.

2. A method of imparting to air or other gas for use in drying or humidifying operations, any desired vapor pressure, and means of regulating the same, consisting in bringing gas which already contains an excess of vapor into intimate contact with a stream or spray of cooling water whose temperature is less than that of the incoming gas, and regulating the temperature of the water in order to control the resulting vapor pressure, and separating the suspended particles of water received from the spray by gravitation and centrifugal force in a manner substantially as described.

3. A method of supplying air or other gas for drying or humidifying purposes at any desired humidity, and means for regulating the same, consisting in first spraying steam into a current of the gas sufficient to raise its absolute humidity to an amount in excess of that required, and subsequently reducing the absolute humidity to the proper amount by intimate contact of the gas with a sheet or spray of cooling water whose temperature is less than that of the gas immediately before contact therewith, and automatically regulating the temperature of the water in order to control the resulting absolute humidity, separating suspended particles of water from the issuing gas, heating the gas to the final temperature, and automatically regulating the amount of steam initially imparted to the gas, in the sequence and manner substantially as described.

4. A method of supplying air or other gas for drying or humidifying purposes at any desired humidity and means for regulating the same, consisting in first spraying steam into the current of gas sufficient to raise its vapor pressure to an amount in excess of that required, and subsequently reducing the humidity to the absolute amount required by intimate contact of the gas with a sheet or spray of cooling water whose temperature is less than that of the gas immediately before contact therewith, and automatically regulating the temperature of the water so as to control the resulting absolute humidity, separating the suspended particles of water from the issuing gas, producing a circulation of the gas, heating the gas to the final temperature desired, and automatically regulating the amount of steam initially supplied to the gas and also the final temperature of the gas, all in the sequence and manner substantially as described.

5. An apparatus for imparting to air or other gas, for drying or humidifying purposes, any desired vapor pressure and means for regulating the same, consisting in the combination of a suitable flue or chamber A A¹ of relatively large area, through which the gas passes, means for injecting steam under regulation into the entering gas to raise its vapor pressure to a point in excess of that required, means for producing a spray of water at a temperature less than that of the gas immediately before contact therewith, through which the gas passes, for reducing the vapor pressure to the required amount by condensation, means for automatically regulating the temperature of the water spray for the purpose of controlling the resulting vapor pressure of the gas, in a manner and sequence substantially as described.

6. An apparatus for imparting to air or other gas, for drying or humidifying purposes, any desired humidity and controlling the same, consisting of the combination of a suitable flue or chamber A A¹ of relatively large area, through which the gas passes, means for injecting steam under regulation into the entering gas to raise its vapor pressure to a point in excess of that required, means of producing a spray of water at a temperature less than that of the gas immediately before contact therewith, through which the gas is made to pass, for reducing the vapor pressure to the required amount by condensation, means for automatically regulating the temperature of the water spray for the purpose of controlling the resulting vapor pressure, a centrifugal separator D, of smaller cross section than the flue A A¹, for the purpose herein explained, and a heater E for raising the gas and vapor to the final temperature desired in the sequence and manner substantially as described.

7. An apparatus for imparting to air or other gas for drying or humidifying purposes any desired humidity and controlling the same, consisting in the combination of a suitable flue or chamber A A¹ of relatively large area, through which the gas passes, means for injecting steam under regulation into the entering gas to raise its vapor pressure to a point in excess of that required, means for producing a spray of water at a temperature less than that of the gas immediately before contact therewith, through which the gas passes, for reducing the vapor pressure to the required amount by condensation, means for automatically regulating the temperature of the water-spray for the purpose of controlling the resulting vapor pressure, a centrifugal fan of smaller cross-sectional area than the space A¹ for the purpose of forcing the current of air and at the same time further separating suspended particles of water received from the spray by centrifugal force, and a heater for raising the gas and vapor to the final temperature desired, in the sequence and manner substantially as described.

Dated at Washington, D. C., March 23, 1910.

HARRY D. TIEMANN.

Witnesses:
 THOMAS G. SHEARMAN,
 R. W. WILLIAMS, Jr.